(12) United States Patent
Kim et al.

(10) Patent No.: US 9,525,530 B2
(45) Date of Patent: Dec. 20, 2016

(54) METHOD FOR FEEDING BACK CHANNEL STATE INFORMATION IN WIRELESS COMMUNICATION SYSTEM AND APPARATUS FOR SAME

(71) Applicant: LG ELECTRONICS INC., Seoul (KR)

(72) Inventors: Hyungtae Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/409,944

(22) PCT Filed: Jul. 12, 2013

(86) PCT No.: PCT/KR2013/006266
§ 371 (c)(1),
(2) Date: Dec. 19, 2014

(87) PCT Pub. No.: WO2014/010989
PCT Pub. Date: Jan. 16, 2014

(65) Prior Publication Data
US 2015/0146641 A1    May 28, 2015

Related U.S. Application Data

(60) Provisional application No. 61/671,076, filed on Jul. 12, 2012, provisional application No. 61/675,830, filed on Jul. 26, 2012.

(51) Int. Cl.
*H04L 5/00* (2006.01)
*H04L 1/00* (2006.01)
*H04L 25/02* (2006.01)

(52) U.S. Cl.
CPC .......... *H04L 5/0048* (2013.01); *H04L 1/0026* (2013.01); *H04L 5/001* (2013.01); *H04L 5/0094* (2013.01); *H04L 5/0023* (2013.01); *H04L 5/0035* (2013.01); *H04L 5/0057* (2013.01); *H04L 25/0204* (2013.01)

(58) Field of Classification Search
None
See application file for complete search history.

(56) References Cited

U.S. PATENT DOCUMENTS

| | | |
|---|---|---|
| 2010/0098012 A1 | 4/2010 | Bala et al. |
| 2011/0206024 A1 | 8/2011 | Lee et al. |
| 2011/0319068 A1 | 12/2011 | Kim et al. |
| 2012/0039252 A1 | 2/2012 | Damnjanovic et al. |

(Continued)

FOREIGN PATENT DOCUMENTS

| | | |
|---|---|---|
| KR | 10-2011-0084964 A | 7/2011 |
| KR | 10-2011-0097617 A | 8/2011 |

(Continued)

*Primary Examiner* — Huy D Vu
*Assistant Examiner* — James P Duffy
(74) *Attorney, Agent, or Firm* — Birch, Stewart, Kolasch & Birch, LLP

(57) ABSTRACT

The present invention relates to a method for a terminal feeding back channel state information in a wireless communication system. More specifically, the method comprises the steps of receiving from a base station setting information on a plurality of pieces of channel state information (CSI); and generating at least one piece of channel state information by applying channel state information of a common subband in accordance with the setting information.

12 Claims, 11 Drawing Sheets

(56) References Cited

U.S. PATENT DOCUMENTS

| | | | |
|---|---|---|---|
| 2012/0176939 A1* | 7/2012 | Qu | H04L 5/0023 |
| | | | 370/255 |
| 2013/0121299 A1 | 5/2013 | Kim et al. | |
| 2013/0242902 A1* | 9/2013 | Liu | H04W 24/10 |
| | | | 370/329 |
| 2013/0258874 A1* | 10/2013 | Khoshnevis | H04L 5/0057 |
| | | | 370/252 |

FOREIGN PATENT DOCUMENTS

| | | |
|---|---|---|
| KR | 10-2012-0001273 A | 1/2012 |
| WO | WO 2012/011657 A2 | 1/2012 |

\* cited by examiner

FIG. 2
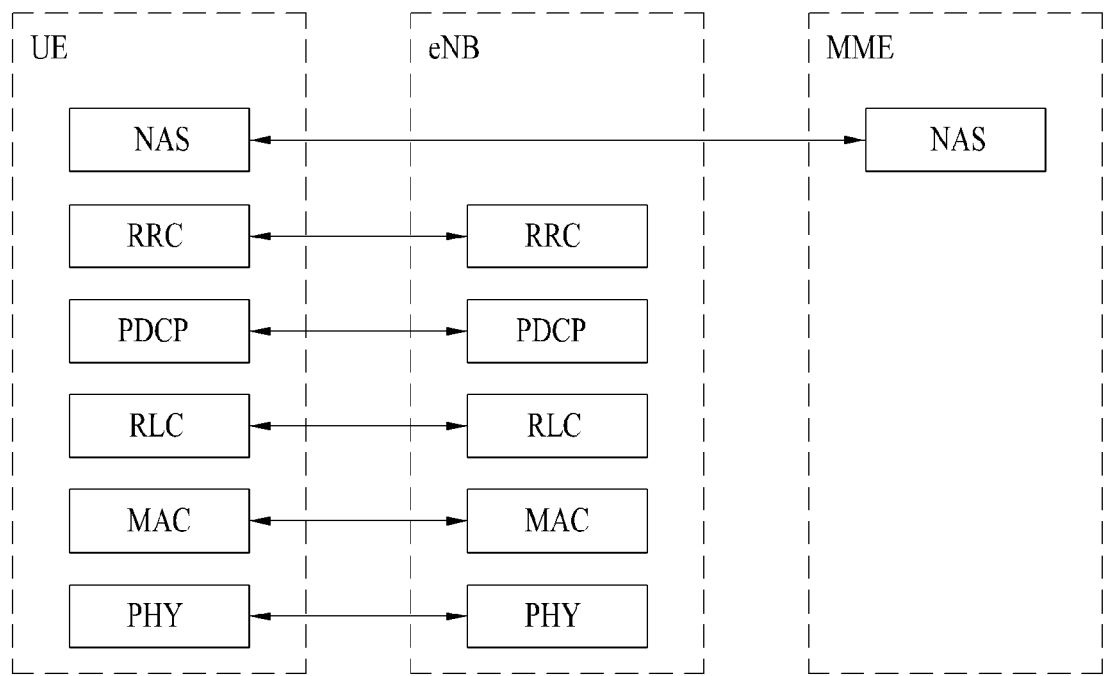
(a) control-plane protocol stack
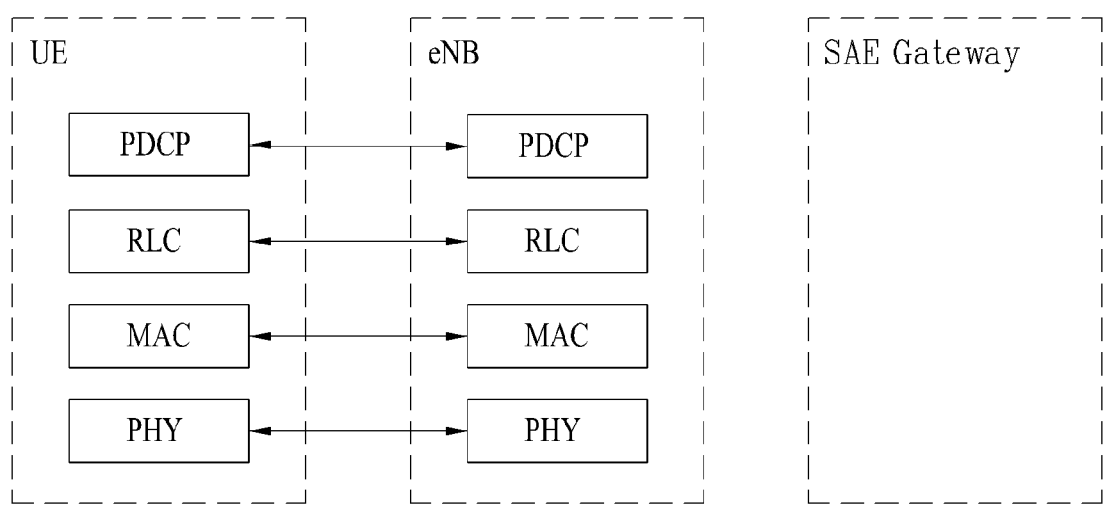
(b) user-plane protocol stack FIG. 12
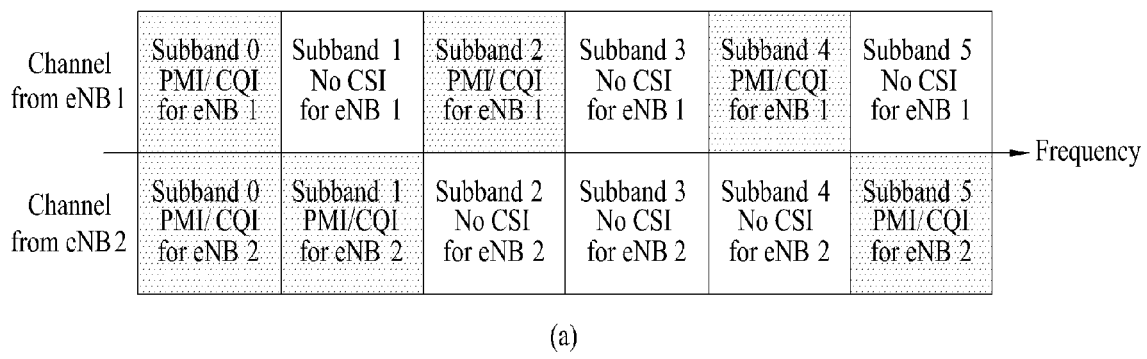
(a)
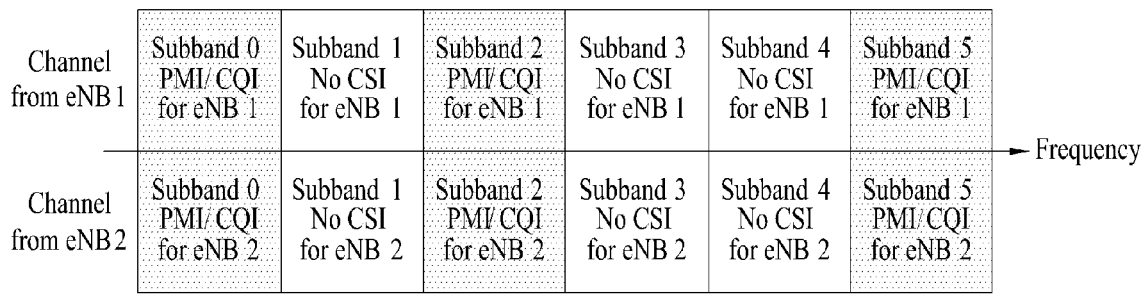
(b)
FIG. 13
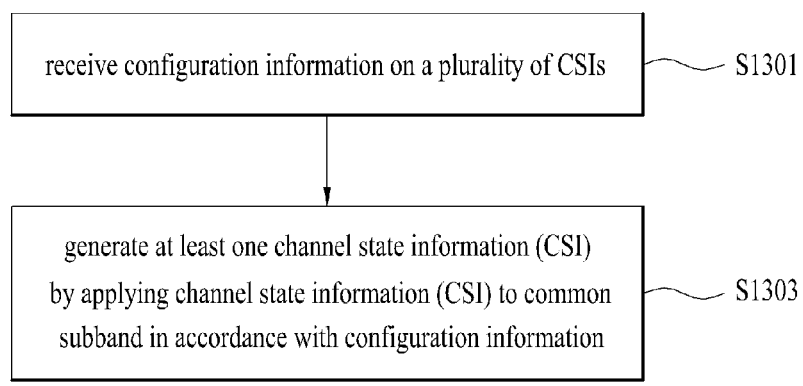

METHOD FOR FEEDING BACK CHANNEL STATE INFORMATION IN WIRELESS COMMUNICATION SYSTEM AND APPARATUS FOR SAME

CROSS REFERENCE TO RELATED APPLICATIONS

This application is the National Phase of PCT International Application No. PCT/KR2013/006266, filed on Jul. 12, 2013, which claims priority under 35 U.S.C. 119(e) to U.S. Provisional Application Nos. 61/671,076 and 61/675,830, filed on Jul. 12, 2012 and Jul. 26, 2012 respectively, all of which are hereby expressly incorporated by reference into the present application.

TECHNICAL FIELD

The present invention relates to wireless communication system, and more particularly, to a method for feeding back channel state information in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The user equipment reports state information of a current channel to the base station periodically and/or non-periodically to assist the base station to efficiently manage the wireless communication system. Since the reported state information includes results calculated considering various statuses, more efficient reporting method will be required.

DISCLOSURE

Technical Problem

Based on the aforementioned discussion, an object of the present invention devised to solve the conventional problem is to provide a method for reporting channel state information in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for feeding back channel state information from a user equipment in a wireless communication system comprises the steps of receiving, from a base station, configuration information on a plurality of kinds of channel state information (CSI); and generating at least one kind of channel state information by applying channel state information on a common subband in accordance with the configuration information.

Moreover, the configuration information includes information on a primary CSI-RS and secondary CSI-RSs, and the primary CSI-RS is defined as a reference CSI-RS for configuring the common subband and the secondary CSI-RSs are defined as CSI-RSs for applying the common subband.

Moreover, the configuration information indicates the at least one kind of channel state information to which the common subband is applied, and the step of generating the at least one kind of channel state information is performed if the number of a plurality of kinds of channel state information configured for the user equipment is more than a threshold value which is previously determined.

Moreover, the configuration information is received using higher layer signaling.

Moreover, the at least one kind of channel state information is determined on the basis of channel state information index (CSI index). Moreover, the channel state information index is determined on the basis of CSI-RS index or IMR index.

To solve the aforementioned technical problems, according to another aspect of the present invention, a method for feeding back channel state information from a user equipment in a wireless communication system, which supports carrier aggregation (CA), comprises the steps of receiving, from a base station, configuration information on a plurality of kinds of channel state information (CSI) applied to a plurality of component carriers (CCs); and generating channel state information by applying channel state information on a common subband to a first component carrier and a second component carrier in accordance with the configuration information.

Moreover, the common channel state information (common CSI) applied to the first component carrier and the common channel state information applied to the second component carrier are different from each other.

Advantageous Effects

According to the embodiment of the present invention, channel state information may more effectively be reported in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 12 is a diagram illustrating an embodiment of CoMP subband selection;

FIG. 13 is a reference diagram illustrating a method for feeding back CSI in accordance with the present invention.

BEST MODE FOR CARRYING OUT THE INVENTION

Figure 1:
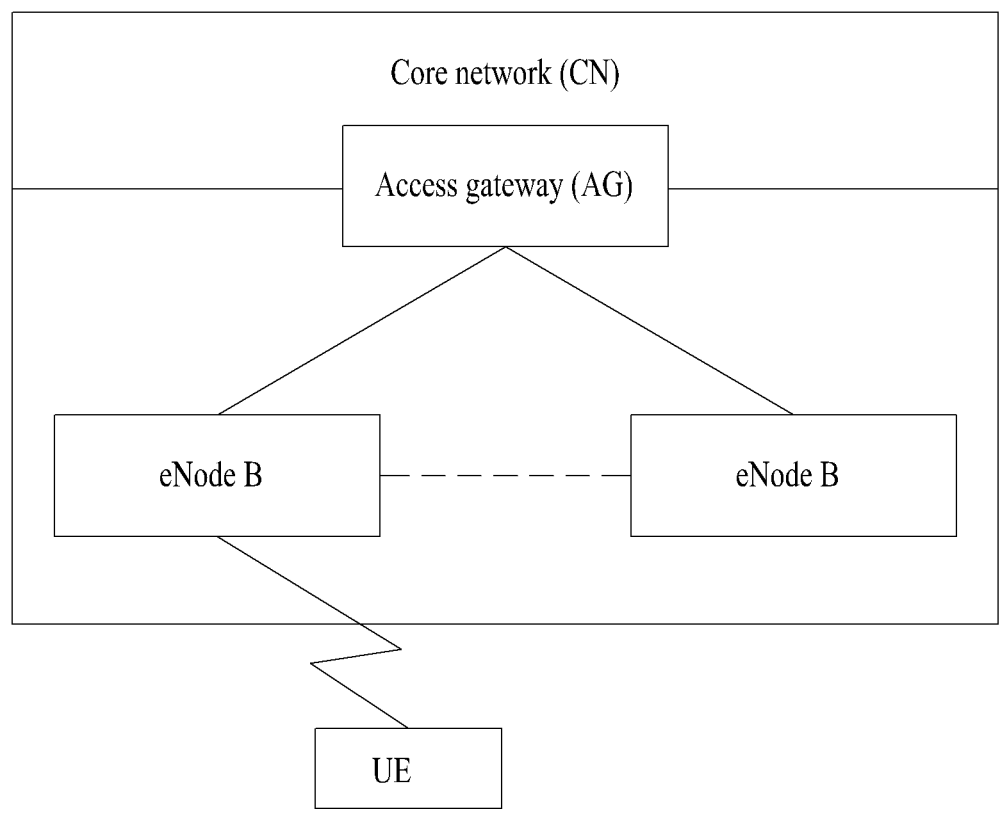
FIG. 1 is a diagram illustrating a network structure of an Evolved Universal Mobile Telecommunications System (E-UMTS) which is an example of a wireless communication system.

Hereinafter, configurations, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
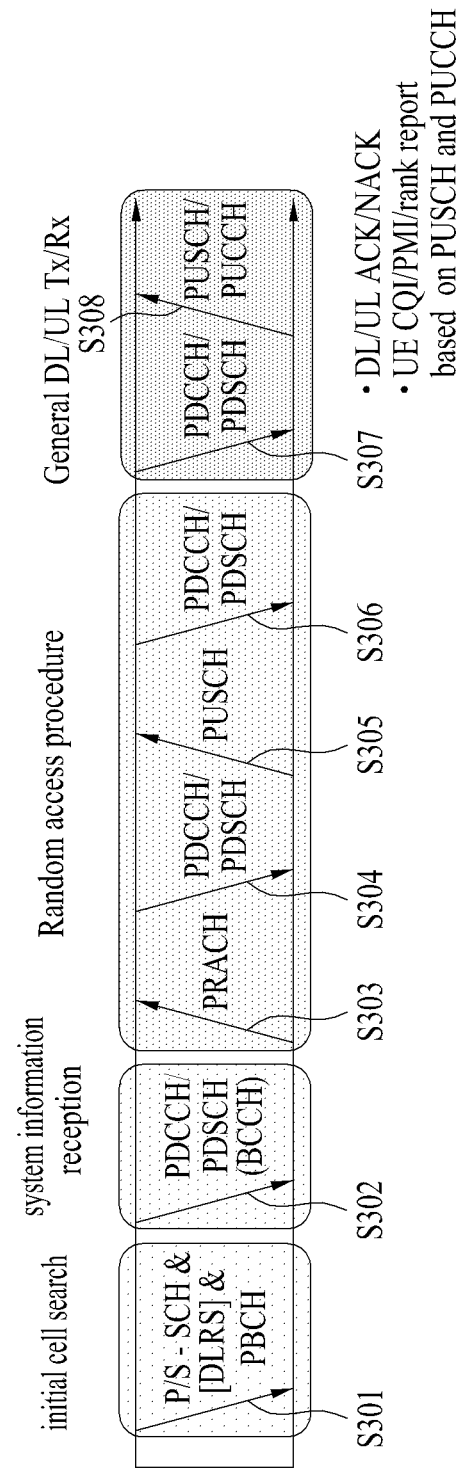
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PDSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and its format is varied depending on its usage.

Meanwhile, control information transmitted from the user equipment to the base station or received from the base station through an uplink includes downlink/uplink ACK/NACK signal, CQI (Channel Quality Indicator), PMI (Precoding Matrix Index), RI (Rank Indicator), etc. In case of a 3GPP LTE system, the user equipment may transmit the control information such as CQI/PMI/RI through the PUSCH and/or the PUCCH.

Figure 4:
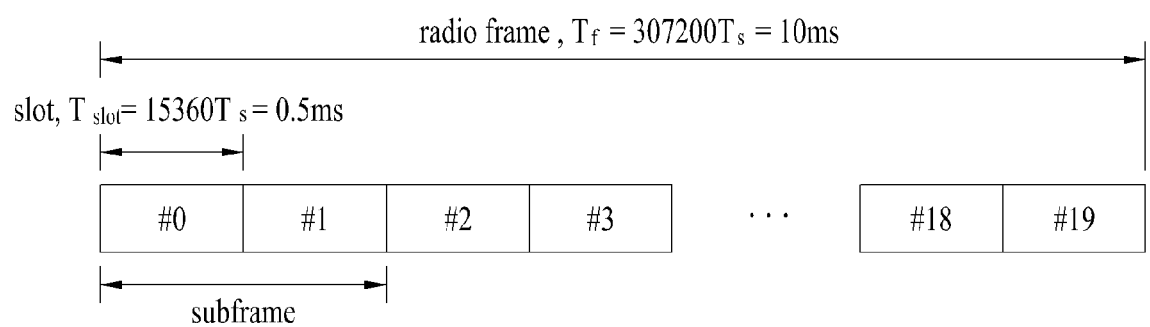
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
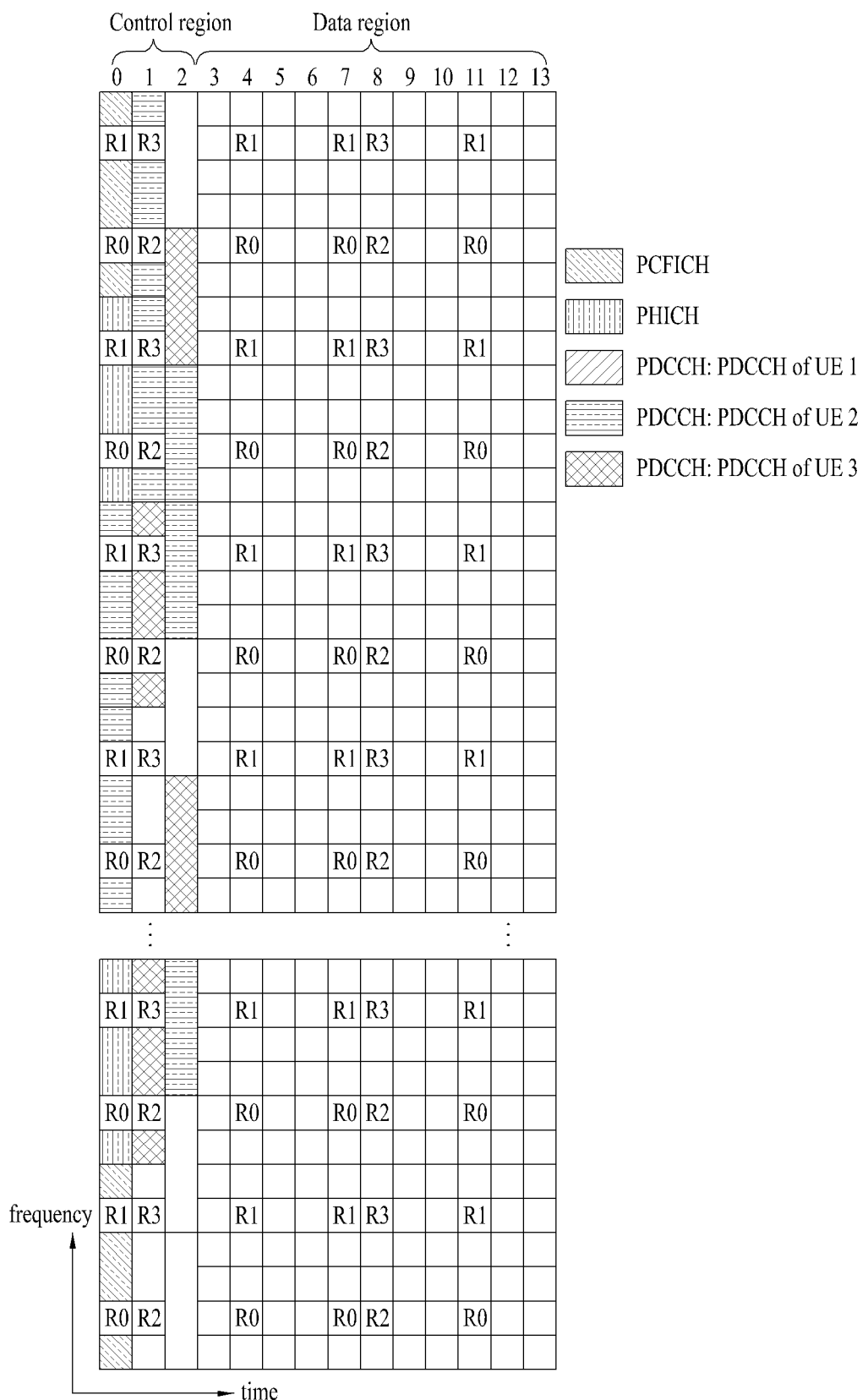
FIG. 5 is a diagram illustrating a structure of a downlink radio frame used in an LTE system.

FIG. 5 is a diagram illustrating a control channel included in a control region of one subframe at a downlink radio frame.

Figure 6:
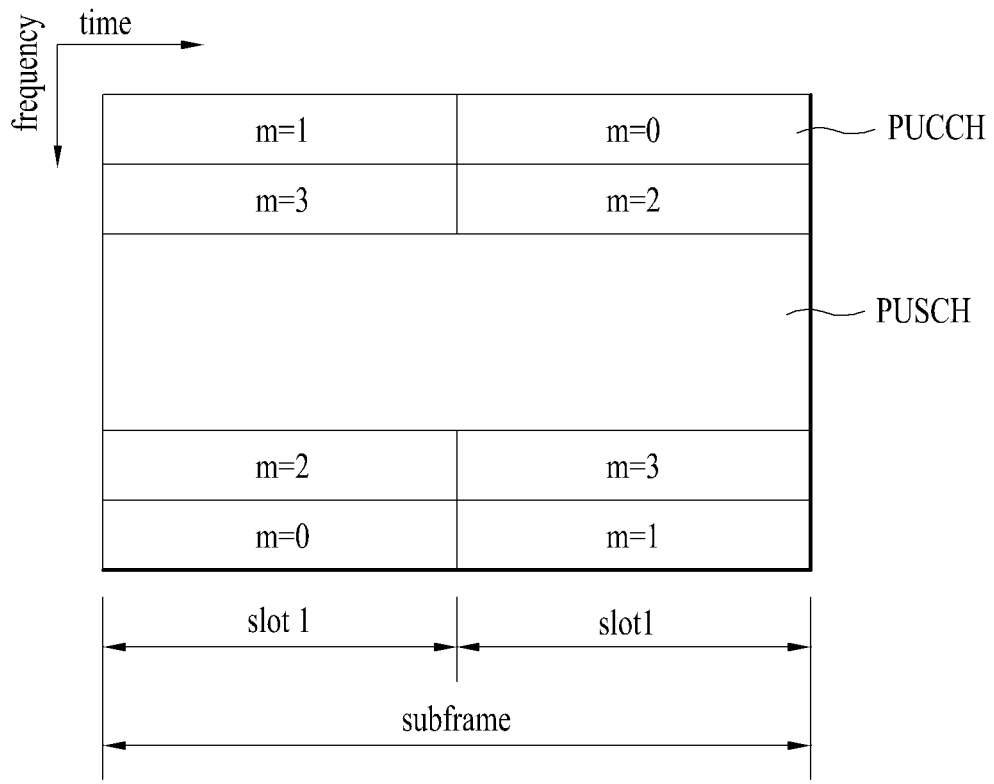
FIG. 6 is a diagram illustrating a structure of an uplink subframe used in an LTE system.

Referring to FIG. 5, the subframe includes fourteen (14) OFDM symbols. First one to three OFDM symbols are used as a control region in accordance with subframe configuration, and the other thirteen to eleven OFDM symbols are used as a data region. In FIG. 6, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrierxone OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

FIG. 6 is a diagram illustrating a structure of an uplink subframe used in an LTE system.

Referring to FIG. 6, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the state of a downlink channel, a rank indicator (RI) for MIMO, and a scheduling request (SR) corresponding to uplink resource allocation request. The PUCCH for one user equipment uses one resource block that reserves different frequencies in each slot within the subframe. Namely, two resource blocks allocated to the PUCCH are subjected to frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

Hereinafter, a Multiple-Input Multiple-Output (MIMO) system will be described. MIMO means a scheme that a plurality of transmitting antennas and a plurality of receiving antennas are used. Data transmission and reception efficiency may be improved by the MIMO scheme. Namely, a transmitter or receiver of the wireless communication system may enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate may be improved within a specific sized cell region, or system coverage may be enhanced with a specific data transmission rate. Also, the MIMO antenna technology may widely be used for a user equipment for mobile communication and a relay station. According to the MIMO antenna technology, it is possible to overcome limitation of a transmission rate in mobile communication according to the related art where a single antenna is used.

Figure 7:
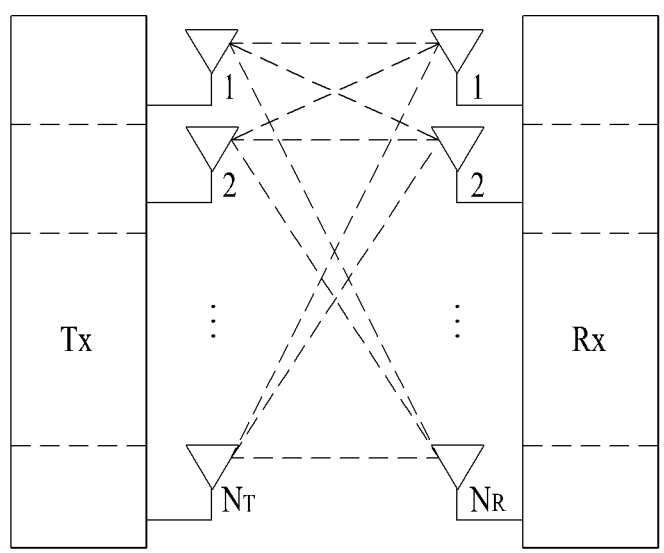
FIG. 7 is a diagram illustrating a configuration of a general MIMO communication system.

A schematic diagram of a general MIMO communication system is illustrated in FIG. 7. Referring to FIG. 7, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used may be increased theoretically, as expressed by the following Equation 1, as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R) \qquad \text{[Equation 1]}$$

For example, in a MIMO communication system that uses four transmitting antennas and four receiving antennas, a transmission rate four times greater than that of a single antenna system may be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method may be expressed as follows. As illustrated in FIG. 7, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information may be expressed by a vector shown in Equation 2 as follows.

$$s = [s_1, s_2, \ldots, s_{N_T}]^T \quad \text{[Equation 2]}$$

Meanwhile, different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ may be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel state. Such transmitting signals $x_1, x_2, \ldots, x_{N_T}$ may be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, a rank in the channel matrix may physically mean the maximum number of rows or columns that may transmit different kinds of information from a given channel. Accordingly, since a rank of the channel matrix is defined by a minimum number of independent rows or columns, it is not greater than the number of rows or columns. For example, a rank H of the channel matrix H is restricted as expressed by the following Equation 6 below.

$$\text{rank}(H) \leq \min(N_T, N_R) \quad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that may transmit different kinds of information. Accordingly, the channel matrix H may be expressed by the following Equation 7.

$$\text{\# of streams} \leq \text{rank}(H) \leq \min(N_T, N_R) \quad \text{[Equation 7]}$$

In this case, "# of streams" represents the number of streams. Meanwhile, it is to be understood that one stream may be transmitted through one or more antennas.

Various methods for corresponding one or more streams to several antennas may exist. These methods may be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme may exist.

Hereinafter, reporting of channel state information (CSI) will be described. In the current LTE standard, an open-loop MIMO transmission system operated without channel information and a closed-loop MIMO transmission system operated based on channel information exist. In particular, in the closed-loop MIMO transmission system, each of the base station and the user equipment may perform beamforming on the basis of channel state information to obtain multiplexing gain of MIMO antenna. The base station allocates a physical uplink control channel (PUCCH) or a physical uplink shared channel (PUSCH) to the user equipment to obtain the channel state information from the user equipment, and commands the user equipment to feed back the channel state information on a downlink signal.

The CSI is classified into three kinds of information, that is, a rank indicator (RI), a precoding matrix index (PMI), and a channel quality indicator (CQI). First of all, RI represents rank information of a channel as described above, and means the number of streams that may be received by the user equipment through the same frequency-time resource. Also, since RI is determined by long term fading of the channel, it is fed back to the base station at a time period longer than that of the PMI and the CQI.

Second, the PMI is a value obtained by reflecting spatial properties of a channel, and represents a precoding matrix index of the base station, which is preferred by the user equipment, on the basis of metric such as SINR. Finally, the CQI is a value indicating channel strength, and means received SINR that may be obtained when the base station uses the PMI.

In the more advanced communication system such as the LTE-A standard, multi-user diversity has been additionally obtained using multi-user MIMO (MU-MIMO). Since interference between user equipments multiplexed in an antenna domain exists in the MU-MIMO, exactness or non-exactness of the CSI may affect interference of the other multiplexed user equipments as well as the user equipment that has reported the CSI. Accordingly, more exact CSI reporting is required in the MU-MIMO than the SU-MIMO.

In this respect, in the LTE-A standard, it has been determined that the design of the final PMI is divided into W1 which is a long term and/or wideband PMI and W2 which is a short term and/or sub-band PMI.

As an example of hierarchical codebook transformation that constitutes one final PMI from W1 and W2, a long term covariance matrix of a channel may be used as expressed by the following Equation 8.

$$W = \text{norm}(W1\,W2) \quad \text{[Equation 8]}$$

In the Equation 8, W2 is a short term PMI, and represents a codeword of a codebook made to reflect short term channel state information, W represents a codeword of the final codebook, and norm(A) means a matrix in which norm for each column of a matrix A is normalized to 1.

A detailed structure of W1 and W2 is expressed by the following Equation 9.

$$W1(i) = \begin{bmatrix} X_i & 0 \\ 0 & X_i \end{bmatrix},$$ [Equation 9]

where $X_i$ is $Nt/2$ by $M$ matrix.

$$W2(j) = \begin{bmatrix} e_M^k & e_M^l & e_M^m \\ & \cdots & \\ \alpha_j e_M^k & \beta_j e_M^l & \gamma_j e_M^m \end{bmatrix} \overset{r\ columns}{}$$

(if rank = $r$), where $1 \le k, l, m \le M$ and $k, l, m$ are integer.

In this case, Nt represents the number of transmitting antennas, and M is the number of columns of a matrix $X_i$ and represents that a total of M number of candidate column vectors exist in the matrix $X_i$. $e_M^k$, $e_M^l$, $e_M^m$ are the kth, lth, and mth column vectors of the matrix $X_i$ in which the kth, lth and mth elements of M number of elements are 1 and the other elements are all 0. $\alpha_j$, $\beta_j$, and $\gamma_j$ are complex values having unit norm, and represent that phase rotation is applied to the kth, lth and mth column vectors of the matrix $X_i$ when the kth, lth and mth column vectors are sorted out. i is an integer more than 0 and represents PMI index indicating W1. j is an integer more than 0 and represents PMI index that indicates W2.

In the Equation 9, the structure of the codeword is designed by reflecting correlation properties of channels if intervals between cross polarized antennas are compact, for example, if the distance between neighboring antennas is less than half of signal wavelength. The cross polarized antennas may be divided into a horizontal antenna group and a vertical antenna group, wherein each of the horizontal antenna group and the vertical antenna group has uniform linear array (ULA) antenna properties, and these two antenna groups are co-located.

Accordingly, the correlation between the antennas of each group has the same linear phase increment properties, and the correlation between the antenna groups has phase rotation properties. Finally, since the codebook is the value obtained by quantization of the channel, the codebook needs to be designed by reflecting channel properties. For convenience of description, rank 1 codeword made by the aforementioned structure may be expressed as follows.

$$W1(i) * W2(j) = \begin{bmatrix} X_i(k) \\ \alpha_j X_i(k) \end{bmatrix} \quad \text{[Equation 10]}$$

In the above Equation 10, the codeword is expressed by vectors of the number of transmitting antennas $N_T \times 1$ vector, and is structuralized by a higher vector $X_i(k)$ and a lower vector $\alpha_j X_i(k)$, each of which has correlation properties of the horizontal antenna group and the vertical antenna group. $X_i(k)$ is preferably expressed by a vector having linear phase increment properties by reflecting the correlation properties between the antennas of each antenna group, and may use a DFT matrix.

As described above, in the LTE system, the channel state information (CSI) includes, but not limited to, CQI, PMI, and RI, and all or some of CQI, PMI and RI are transmitted in accordance with a transmission mode of each user equipment. Periodic transmission of the channel state information will be referred to as periodic reporting, and transmission of the channel state information based on a request of the base station will be referred to as aperiodic reporting. In case of aperiodic reporting, a request bit included in uplink scheduling information transmitted from the base station is transmitted to the user equipment. Afterwards, the user equipment transfers the channel state information considering its transmission mode to the base station through an uplink data channel (PUSCH). In case of periodic reporting, a period and offset at the corresponding period are signaled to each user equipment in a unit of subframe semi-statically through an upper layer signal. Each user equipment transfers the channel state information considering the transmission mode to the base station through an uplink control channel (PUCCH). If uplink data simultaneously exist at the subframe for transmitting the channel state information, the channel state information is transmitted together with data through the uplink data channel (PUSCH). The base station transmits transmission timing information suitable for each user equipment to the user equipment by considering a channel status of each user equipment and a distribution status of user equipments within a cell. The transmission timing information includes a period for transmitting the channel state information, offset, etc., and may be transmitted to each user equipment through RRC message.

Figure 8:
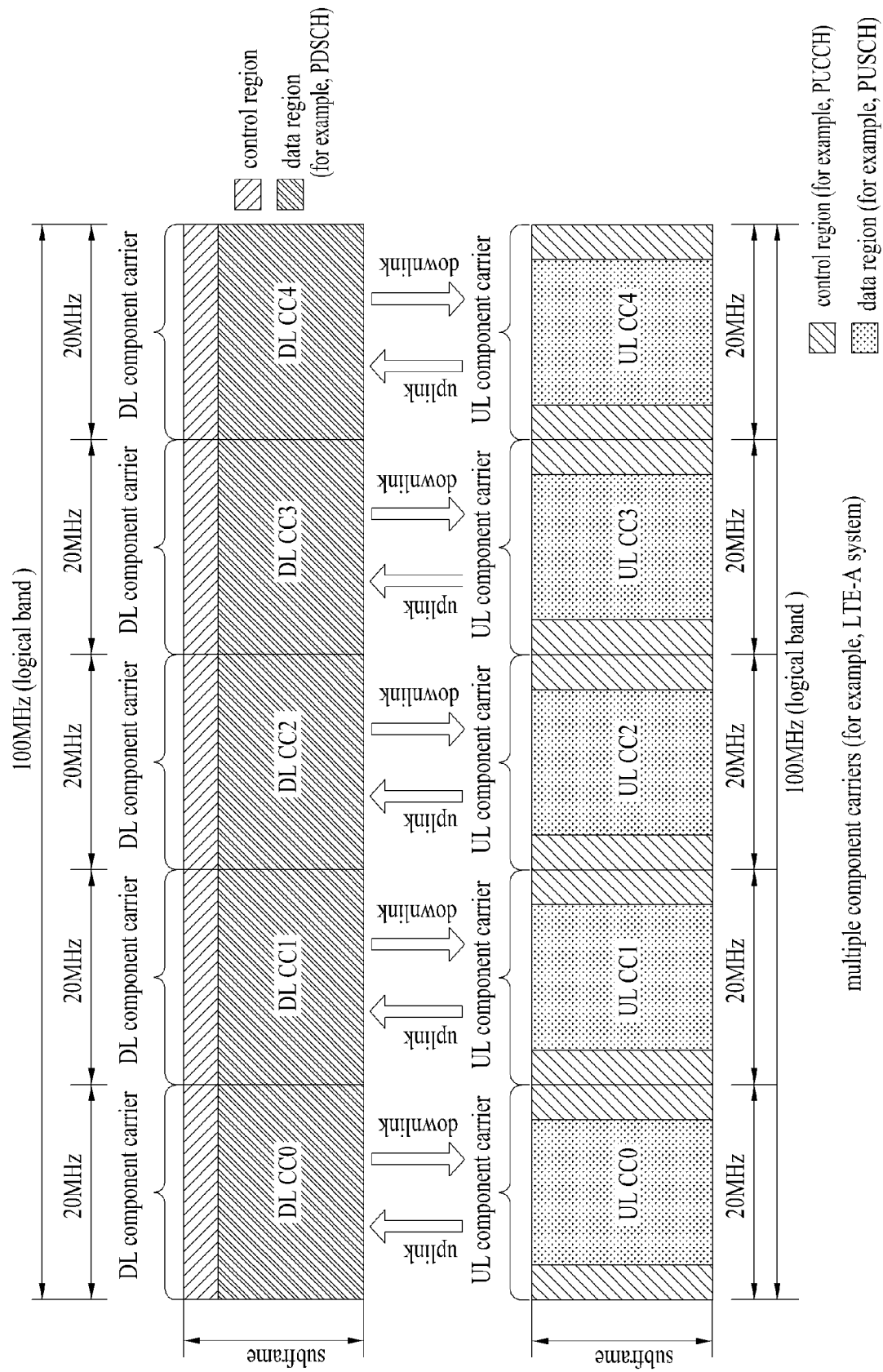
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs (SCCs). The PCC may be used such that the user equipment may perform an initial connection establishment procedure or connection re-establishment procedure. The PCC may refer to a cell indicated during a handover procedure. The SCC may be configured after RRC connection is established, and may be used to provide an additional radio resource. For example, if cross-carrier scheduling (or cross-CC scheduling) is used, the PDCCH for downlink allocation may be transmitted to DL CC#0, and the corresponding PDSCH may be transmitted to DL CC#2. The terminology "component carrier" may be replaced with another equivalent terminology (for example, carrier, cell, etc.).

For cross-carrier scheduling, a carrier indicator field (CIF) is used. Configuration of the presence or not of the CIF within the PDCCH may be enabled by upper layer signaling (for example, RRC signaling) semi-statically and user equipment-specifically (or user equipment group-specifically). The base line of PDCCH transmission may be summed up as follows.

CIF disabled: the PDCCH on the DL CC allocates PDSCH resource on the same DL CC or PUSCH resource on one linked UL CC.

No CIF

CIF enabled: the PDCCH on the DL CC may allocate PDSCH or PUSCH resource on one DL/UL CC of a plurality of aggregated DL/UL CCs by using the CIF.

LTE DCI format extended to have CIF

CIF (if configured) is a fixed x-bit field (for example, x=3)

CIF (if configured) location is fixed regardless of DCI format size.

If the CIF exists, the base station may allocate a PDCCH monitoring DL CC (set) to reduce complexity of blind detection (BD) in view of the user equipment. For PDSCH/PUSCH scheduling, the user equipment may detect and decode the PDCCH on the corresponding DL CC only. Also, the base station may transmit the PDCCH through monitoring DL CC (set) only. The monitoring DL CC set may be set user equipment-specifically, user equipment group-specifically or cell-specifically.

Figure 9:
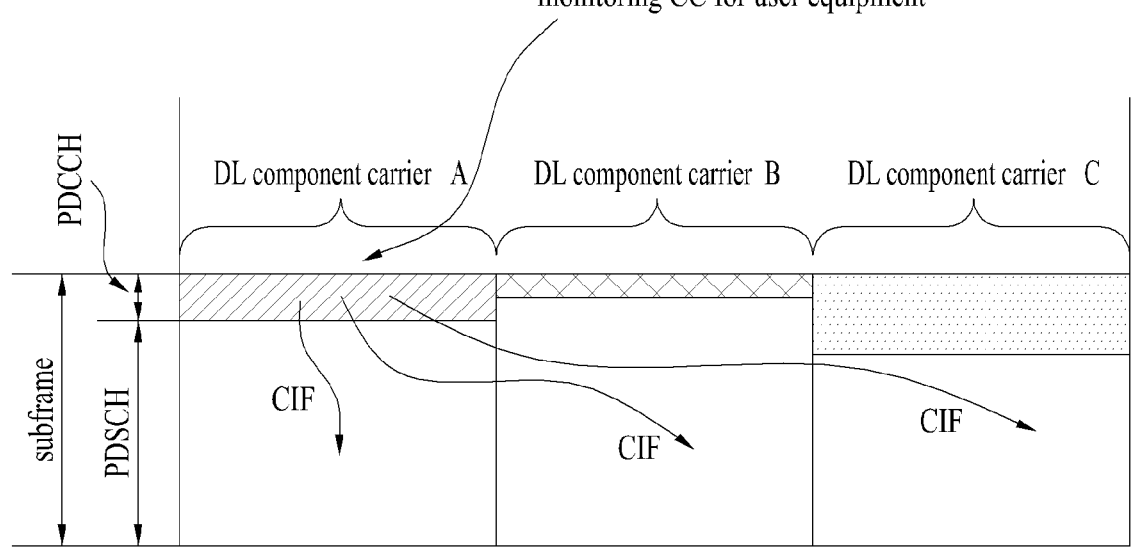
FIG. 9 is a diagram illustrating that three DL CCs are aggregated and DL CC A is set to monitoring DL CC.

FIG. 9 illustrates that three DL CCs are aggregated and DL CC A is set to a monitoring DL CC. If the CIF is disabled, each DL CC may transmit the PDCCH that schedules a PDSCH of each DL CC without CIF in accordance with the LTE PDCCH rule. On the other hand, if the CIF is enabled by upper layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC.

Hereinafter, Cooperative Multipoint Transmission/Reception (CoMP) will be described.

The post-LTE-A system considers a system that enhances system throughput through cooperation between cells. This system will be referred to a Cooperative Multipoint Transmission/Reception (CoMP) system. The CoMP system means a communication system that two or more base stations, access points or cells perform communication with the user equipment in cooperative with one another to effectively perform communication between a specific user equipment and the base station, access point or cell. In this specification, the base station, the access point, or the cell may be used to refer to the same thing.

Generally, in a multi-cell environment where a frequency reuse factor is 1, throughput of the user equipment located at the cell edge and average sector throughput may be reduced due to inter-cell interference (ICI). In order to reduce ICI, a method for enabling a user equipment located at the cell edge in an environment restricted by interference to have proper throughput by using a simple passive scheme such as fractional frequency reuse (FFR) through user equipment specific power control has been applied to the LTE system according to the related art. However, it may be more preferable to reduce ICI or allow the user equipment to reuse ICI as a desired signal than to reduce use of frequency resources per cell. To this end, a CoMP transmission scheme may be used.

Figure 10:
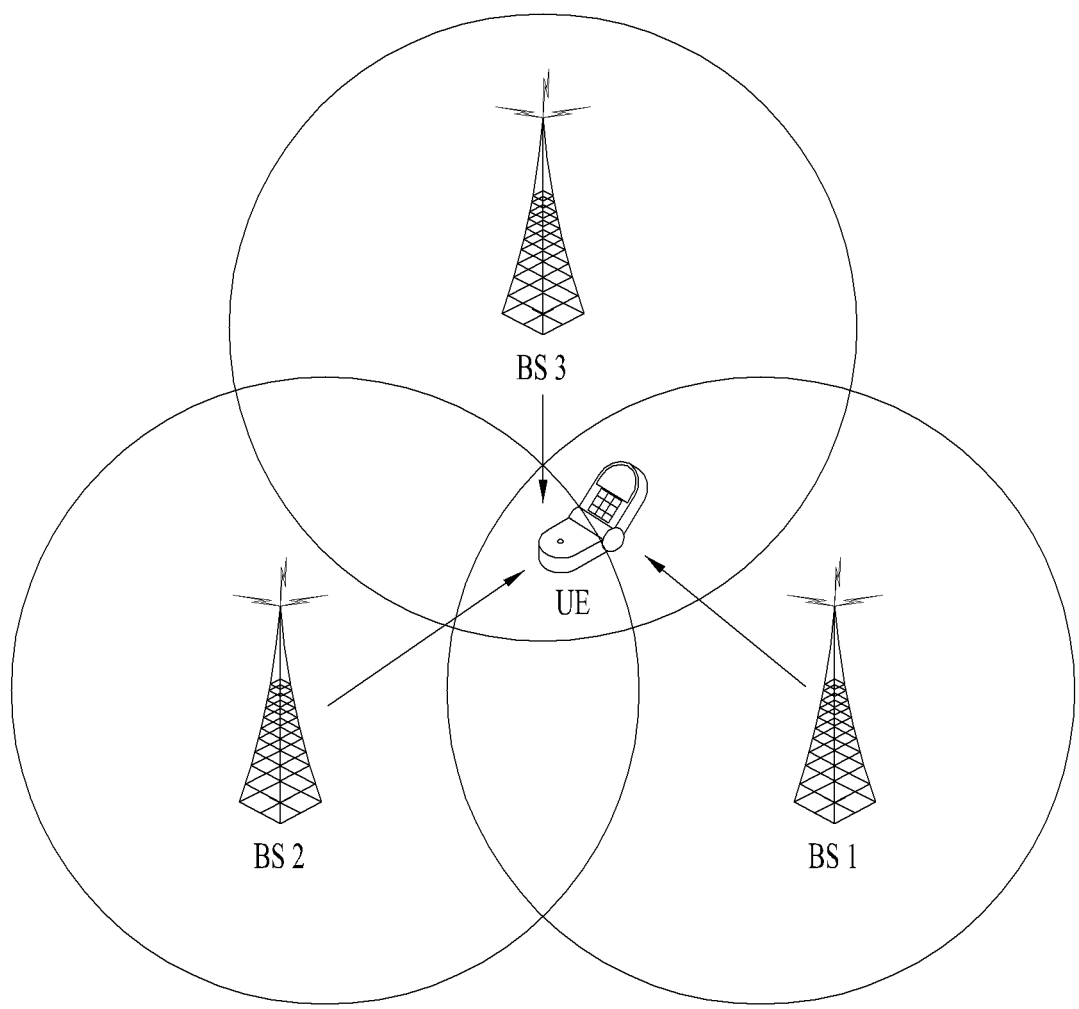
FIG. 10 is a diagram illustrating an example of CoMP which is performed.

FIG. 10 is a diagram illustrating an example of performing CoMP. Referring to FIG. 10, the wireless communication system includes a plurality of base stations BS1, BS2 and BS3, which perform CoMP, and a user equipment. The plurality of base stations BS1, BS2 and B3 that perform CoMP may efficiently transmit data to the user equipment in cooperative with one another.

Examples of the CoMP transmission scheme may include a coordinated MIMO type joint processing (CoMP-JP) scheme through data sharing and a CoMP-coordinated scheduling/beamforming (CoMP-CS/CB) scheme.

In case of a downlink according to the joint processing (CoMP-JP) scheme, the user equipment may simultaneously receive data from each base station that performs the CoMP transmission scheme, and may improve receiving throughput by combining the signals received from each base station (joint transmission; JT). Also, there may be considered a method (dynamic point selection, DPS) for transmitting data from one of base stations, which perform the CoMP transmission scheme, to the user equipment at a specific time. Unlike this method, according to the coordinated scheduling/beamforming (CoMP-CS/CB) scheme, the user equipment may momentarily receive data from one base station, that is, serving base station, through beamforming.

In case of an uplink, according to the joint processing (CoMP-JP) scheme, the respective base stations may simultaneously receive a PUSCH signal from the user equipment (Joint Reception; JR). Unlike this, according to the coordinated scheduling/beamforming (CoMP-CS/CB) scheme, only one base station may receive a PUSCH signal. At this time, cooperative cells (or base stations) determine to use the coordinated scheduling/beamforming scheme.

The user equipment, which uses the CoMP transmission scheme, that is, CoMP UE may feed channel information back (CSI feedback) to a plurality of base stations that perform the CoMP transmission scheme. A network scheduler may select a proper CoMP transmission scheme that may increase a transmission rate, from the CoMP-JP scheme, the CoMP-CS/CB scheme and the DPS scheme, on the basis of the CSI feedback. To this end, the CoMP UE may configure CSI feedback within a plurality of base stations, which perform the CoMP transmission scheme, in accordance with a periodic feedback transmission scheme based on an uplink PUCCH. In this case, feedback configuration for each base station may be independent. Accordingly, in this specification according to one embodiment of the present invention, feedback operation of channel information in accordance with independent feedback configuration will be referred to as CSI process. One or more CSI processes may exist in one serving cell.

Figure 11:
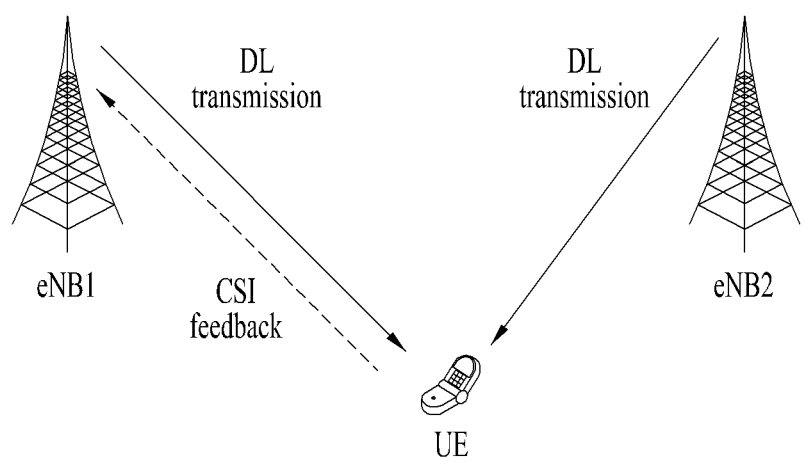
FIG. 11 is a diagram illustrating that downlink CoMP operation is performed.

FIG. 11 is a diagram illustrating that downlink CoMP operation is performed.

In FIG. 11, the UE is located between eNB1 and eNB2, and two eNBs (that is, eNB1 and eNB2) perform a proper CoMP operation such as JT, DCS, and CS/CB to solve interference to the UE. The UE performs proper CSI feedback to assist CoMP operation of the base station. Information transmitted through CSI feedback includes PMI information and CQI information of each eNB, and may additionally include channel information (for example, phase offset information between two eNBs) between two eNBs for JT.

In FIG. 11, although the UE transmits a CSI feedback signal to the eNB1 which is its serving cell, the UE may transmit the CSI feedback signal to the eNB2 or two eNBs in accordance with the status. Also, although FIG. 11 illustrates eNB as a basis unit for joining CoMP, the present invention may be applied CoMP between transmission points controlled by a single eNB.

In other words, for CoMP scheduling at the network, the UE should feed back downlink (DL) CSI information of a neighboring eNB/TP, which joins CoMP, as well as DL CSI information of a serving eNB/TP. To this end, the UE feeds back a plurality of CSI processes, which reflect various data transmission eNBs/TPs and various interference environments.

Accordingly, in the LTE system, an interference measurement resource (IMR) is used for interference measurement during CoMP CSI calculation. A plurality of IMRs may be configured for one UE, and one UE has independent configuration for each of the plurality of IMRs. In other words, period, offset and resource of each IMR are independently configured, and the base station may transmit a signal to the UE through upper layer signaling (RRC, etc.).

Also, in the LTE system, CSI-RS is used for channel measurement required during CoMP CSI calculation. A plurality of CSI-RSs may be configured for one UE, and at this time, each CSI-RS has independent configuration. In other words, period, offset, resource, power control (PC), and the number of antenna ports of each CSI-RS are independently configured, and information related to the CSI-RS is signaled from the base station to the UE through upper layer signaling (RRC, etc.).

Among the plurality of CSI-RSs and the plurality of IMRs, which are configured for the UE, one CSI process may be configured in association with one CSI-RS resource for signal measurement and one IMR for interference measurement. The UE feeds back CSI information derived from different CSI processes to the network (for example, base station) by using an independent period and subframe offset.

In other words, each CSI process has independent CSI feedback configuration. Association information on the CSI-RS resource and the IMR resource and CSI feedback configuration may be notified from the base station to the UE through upper layer signaling such as RRC per CSI process. For example, it is assumed that three CSI processes are configured for the UE as illustrated in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent CSI-RS received from the eNB 1 which is a serving base station (serving eNB) of the UE and CSI-RS received from the eNB 2 which is a neighboring eNB which joins cooperation. It is assumed that IMR configured for each CSI process of Table 1 is configured as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference from the other eNBs except the eNB 1. Likewise, in IMR 1, the eNB 2 performs muting, the eNB 1 performs data transmission, and the UE is configured to measure interference from the other eNBs except the eNB 2. Also, in IMR 2, both the eNB 1 and the eNB 2 perform muting, and the UE is configured to measure interference from the other eNBs except the eNB 1 and the eNB 2.

Accordingly, as illustrated in Table 1 and Table 2, CSI information of the CSI process 0 represents optimized RI, PMI and CQI information if data are received from the eNB 1. CSI information of the CSI process 1 represents optimized RI, PMI and CQI information if data are received from the eNB 2. CSI information of the CSI process 2 represents optimized RI, PMI and CQI information if data are received from the eNB 1 and if there is no interference from the eNB 2.

Hereinafter, it is assumed that subbands selected to transmit channel state information to each transmission point may be overlapped with each other. Hereinafter, dynamic cell selection and joint transmission will be described respectively.

FIG. 12 is a diagram illustrating an embodiment of independent subband selection per transmission point.

The user equipment may independently select a subband per transmission point. That is, as shown in (a) of FIG. 12, the user equipment may select subbands 0, 2 and 4 for the first transmission point eNB1 and select subbands 0, 1 and 5 for the second transmission point eNB2, and then transmit channel state information on the selected subbands. In more detail, in the procedure of reporting channel state information to each transmission point, since the user equipment independently selects the subbands, some subbands may be matched with one another as shown in FIG. 12(a), or all subbands selected for each transmission point may be matched with one another although not shown. Although it is preferable that the aforementioned description is applied to dynamic cell selection, the aforementioned description does not restrict application to joint transmission.

In case of joint transmission, since the user equipment receives signals from the two transmission points at the same time, it is preferable to select subbands having good combining channel quality of the two transmission points. That is, as shown in (b) of FIG. 12, the user equipment may select subbands equally for the two transmission points eNB1 and eNB2 and report channel state information on each subband. Even in case of joint transmission, if the user equipment selects different subbands per transmission point as shown in (a) of FIG. 12, the user equipment may have channel state information only on one transmission point at one subband, whereby effective joint transmission cannot be performed. Also, in this case, since the subbands selected for the two transmission points are the same as each other, the user equipment may report information on subband selection only once, whereby feedback overhead may be reduced. Alternatively, instead of reporting information on the same subband selection to each transmission point, a bit used to report information on subband selection to any one of the two transmission points, that is, a subband selector may be used for another usage. This will be described in detail as follows.

First, the subband selector may be used for reporting of wideband channel state information.

Second, the subband selector may be used to report CQI generated in case of JT or CS/CB. The user equipment may report a CQI value, which is calculated on the assumption that PMI reported simultaneously by the first and second transmission points is used, through the subband selector. In case of CS/CB, for example, a CQI value may be reported using the subband selector, wherein the CQI value is calculated on the assumption that the first transmission point performs transmission by using PMI reported by the user equipment and the second transmission point generates interference by using random PMI orthogonal to the PMI reported by the user equipment. As a result, CQI, which may be achieved when CoMP operation is performed using the subband selector of any one transmission point (for example, second transmission point), may be reported, wherein the subband selector is set to select subband equally for each transmission point and does not provide information any more.

Third, the subband selector may be used to report channel information between the two transmission points. For example, the subband selector may be used to report phase and/or amplitude information between the first transmission point and the second transmission point. When information between two transmission point channels is reported, one port of reference signals (RSs) used for channel estimation of each transmission point may be selected, and phase and/or amplitude information between the two ports may be reported. In this case, the network may configure a third RS other than the RS configured to estimate an individual channel of each transmission point, for the user equipment. The third RS may be configured to exit only if the number of transmitting antennas is two because it is required to report only phase and/or amplitude information of the two ports.

Details of subband selection under the aforementioned CoMP environment may be understood with reference to the disclosure of the International Application Number "PCT/KR2012/006989".

Moreover, in the present invention, in subband selection of each eNB channel, a method for applying a common subband to CSI of some eNB channels and applying an individual subband to CSI of the other eNB channels in the same manner as a legacy system will be described in more detail.

FIG. 13 is a reference diagram illustrating a method for feeding back CSI in accordance with the present invention.

Referring to FIG. 13, N number of CSI-RSs corresponding to N number of eNB channels are configured for the user equipment UE (N is a natural number). That is, the user equipment receives configuration information for feeding back a plurality of kinds of channel state information, from the base station (S1301).

The UE calculates PMI and CQI for some CSI-RSs of N number of CSI-RSs on the basis of the common subband and calculates PMI and CQI for the other CSI-RSs on the basis of an independent subband in the same manner as the legacy system, and then feeds the calculated result back to the base station (S1303).

For convenience of description, although it is assumed that one CSI-RS is configured for one eNB in the aforementioned description, multiple CSI-RSs may be applied to one user equipment in the same manner as that CSI-RSs of a plurality of radio remote headers (RRHs) connected to one eNB are configured for the UE.

Moreover, information as to CSI-RS of multiple CSI-RSs configured for the user equipment, to which a common subband should be applied, may be notified from the base station to the user equipment through higher layer signaling such as RRC or a control channel such as PDCCH.

Hereinafter, detailed embodiments according to the present invention will be described.

First Embodiment

According to the first embodiment of the present invention, CSI-RSs to which the common subband is applied may be divided into a primary CSI-RS and secondary CSI-RSs and then may be signaled from the base station to the user equipment.

At this time, the primary CSI-RS means a reference CSI-RS for subband selection, and the user equipment configures an optimized subband on the basis of the primary CSI-RS, and PMI and CQI of the secondary CSI-RSs may be generated on the basis of the subband configured on the basis of the primary CSI-RS. Moreover, a plurality of CSI-RSs as well as one CSI-RS may be configured as the primary CSI-RS.

The aforementioned first embodiment of the present invention may usefully be applied to a case where a plurality of CSI feedbacks based on different CoMP schemes are performed.

For example, under the environment that one user equipment receives a service from the eNB 1, and the eNB 2 and the eNB 3 join cooperation, it is assumed that the eNB 2 preferably performs cooperation in accordance with JT or CS/CB and the eNB 3 preferably performs cooperation in accordance with DPS. In this case, the user equipment may generate CSI based on a common subband for eNB 1 channel and eNB 2 channel and generate CSI based on an individual subband for eNB 3 channel, thereby performing CSI feedback.

For convenience of description, although the aforementioned embodiment has been described based on the case where CSI is generated based on the common subband for some of the entire CSI-RSs, the aforementioned embodiment may equally be applied to even a case where same RI or same PMI is generated. That is, RI or PMI calculated from some of the entire CSI-RSs may be restricted to have the same value as that of (CSI generated based on the common subband).

Second Embodiment

For CoMP, the user equipment generates and feeds back a plurality of CSIs by considering a channel of eNB/TP (transmission point) that joins cooperation. At this time, as described above, each CSI is configured in such a manner that a channel part is associated with an interference part, wherein the channel part is estimated from one CSI-RS within a CoMP measurement set, and the interference part is estimated from one IMR (interference measurement resource).

Accordingly, when a plurality of CSI feedbacks are configured for one user equipment, the second embodiment of the present invention suggests that the user equipment generates and feeds back CSI by using common channel state information (common CSI) if the number of the configured CSIs is more than N (N is an integer). According to the second embodiment of the present invention, UE complexity required during CSI calculation may be lowered, and CSI feedback overhead may be reduced.

Also, although the second embodiment will hereinafter be described based on common CSI for convenience description, the common CSI may mean at least one of common rank indicator (RI), common subband, and common PMI and even in this case, the same technical spirits may be applied thereto.

The second embodiment of the present invention may be applied to both non-CA environment that does not support a carrier aggregation scheme and CA environment that supports a carrier aggregation scheme.

First of all, application of the second embodiment of the present invention to the non-CA environment will be described.

If the number of CSIs configured for the user equipment is more than N, the user equipment generates all or some CSIs by using common CSI and then feeds the generated CSIs back to the base station. If the common CSI is used (or referred) to generate some CSIs, some CSIs of all CSIs configured for the user equipment may be configured using the control signal such as RRC, wherein the common CSI will be applied to some CSIs.

For example, when N=3 and the number of CSIs configured for the user equipment is 4, if CSIs to which the common CSI will be applied through the control signal such as RRC are configured as CSI 0, CSI 1 and CSI 2, the user equipment applies the common CSI to CSI 0, CSI 1 and CSI 2, and calculates CSI for the other CSI 3 as before.

Alternatively, even though some CSIs are not configured through a separate control signal, these CSIs may be determined in accordance with a given rule. For example, some CSIs may be calculated by applying the common CSI to the 0th CSI of the lowest index to the Kth CSI (K is an integer). Otherwise, the common CSI may be applied to the CSI generated from 0th to Kth values on the basis of CSI-RS index or IMR index instead of CSI index. That is, the common CSI may be applied to a plurality of CSIs (for example, CSI 0 to CSI L (L is an integer)) generated with reference to the CSI-RS indexes 0 to K as the channel part. Otherwise, the common CSI may be applied to a plurality of CSIs (CSI 0 to CSI L) generated with reference to the IMR indexes 0 to K as the interference part.

Next, application of the second embodiment of the present invention to the CA environment will be described.

If a plurality of component carriers (CCs) are configured for the user equipment, the second embodiment of the present invention may be applied as follows.

First, the second embodiment of the present invention may be applied to each component carrier in the same manner as the aforementioned non-CA environment. That is, since the operation according to the present invention assumes a single component carrier (CC) in the aforementioned non-CA environment, the operation according to the present invention may equally be applied to each secondary component carrier of the CA environment.

In this case, although the number N (N is a natural number) of CSIs configured for each component carrier (CC) may be determined independently, the same number N of CSIs may be configured for all component carriers. Likewise, although CSI which will be generated as the common CSI is applied to each component carrier may be configured independently, some CSIs to which the common CSI will be applied regardless of the component carrier may be configured commonly. Also, if CSI to which the common CSI will be applied to each component carrier (CC) is configured independently, the CSI determined for each component carrier may be higher-layer signaled (for example, RRC signaled), or an independent rule for CSI configuration may be applied to each component carrier.

Second, if the number of CSIs configured for all component carriers is more than P (P is an integer, P>N), the user equipment may generate and feed back CSI by applying the common CSI to all or some CSIs. In this case, the common CSI may be applied between CSIs of the same component carrier but the common CSI may not be applied between CSIs of different component carriers. This is because that it is preferable not to apply the common CSI between the CSIs of different component carriers due to the possibility of independent channel environments between different component carriers.

Figure 14:
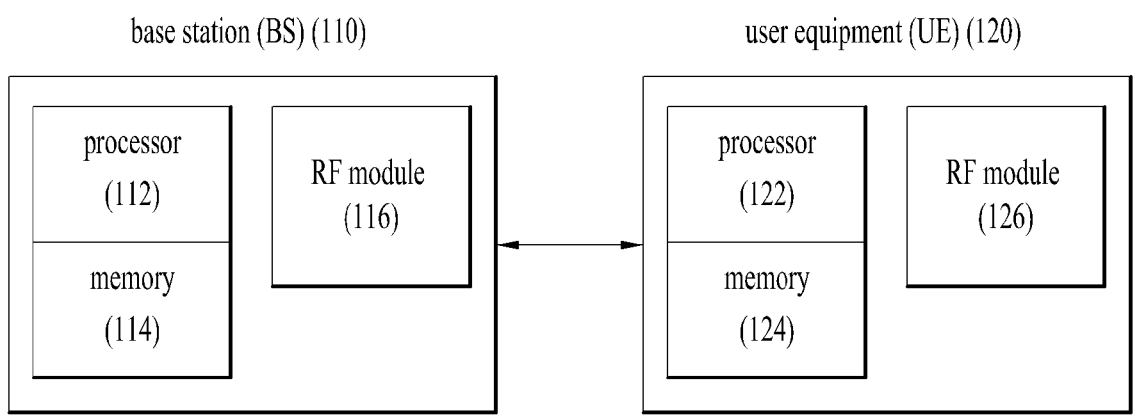
FIG. 14 is a diagram illustrating a base station and a user equipment, which may be applied to the embodiment of the present invention.

FIG. 14 is a diagram illustrating a base station and a user equipment, which may be applied to the embodiment of the present invention.

If a relay is included in the wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 14, the wireless communication system includes a base station (BS) 110 and a user equipment (UE) 120. The base station 110 includes a processor 112, a memory 114, and a radio frequency (RF) module 116. The processor 112 may be configured to implement procedures and/or methods suggested in the present invention. The memory 114 is connected with the processor 112 and stores various kinds of information related to the operation of the processor 112. The RF module 116 is connected with the processor 112 and transmits and/or receives a radio signal. The user equipment 120 includes a processor 122, a memory 124, and a radio frequency (RF) module 126. The processor 122 may be configured to implement procedures and/or methods suggested in the present invention. The memory 124 is connected with the processor 122 and stores various kinds of information related to the operation of the processor 122. The RF module 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes including the base station may be performed by the base station or network nodes other than the base station. The 'base station' (BS) may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for feeding back channel state information in a wireless communication system and the apparatus for the same have been described based on the 3GPP LTE system, the method and apparatus may be applied to various wireless communication systems in addition to the 3GPP LTE system.

The invention claimed is:

1. A method for feeding back channel state information (CSI) from a user equipment (UE) in a wireless communication system, the method comprising:
receiving, by the UE from a base station, configuration information, a primary CSI reference signal (CSI-RS) and a secondary CSI-RS;
configuring, by the UE, a common subband based on the primary CSI-RS and a combining channel quality of a subband related with both a serving cell and a first cooperative cell, wherein the first cooperative cell is configured to perform a joint transmission with the serving cell;
generating, by the UE, first CSI on the configured common subband for both the serving cell and the first cooperative cell; and
generating, by the UE, second CSI on an individual subband for a second cooperative cell,
wherein the second CSI is generated to correspond to the secondary CSI-RS, and
wherein the second cooperative cell is configured to perform a transmission different than the joint transmission.

2. The method according to claim 1, wherein the configuration information indicates CSI to which the configured common subband is applied.

3. The method according to claim 1, wherein the configuration information is received using higher layer signaling.

4. The method according to claim 1, wherein the CSI is determined based on a CSI index.

5. The method according to claim 4, wherein the CSI index is determined based on a CSI-RS index.

6. The method according to claim 4, wherein the CSI index is determined based on an interference measurement resource (IMR).

7. A user equipment (UE) for feeding back channel state information (CSI) in a wireless communication system, the UE comprising:
a receiver; and
a processor configured to:
control the receiver to receive, from a base station, configuration information, a primary CSI reference signal (CSI-RS) and a secondary CSI-RS,
configure a common subband based on the primary CSI-RS and a combining channel quality of subband related with both a serving cell and a first cooperative cell, wherein the first cooperative cell is configured to perform a joint transmission with the serving cell,
generate first CSI on the configured common subband for both the serving cell and the first cooperative cell, and
generate second CSI on an individual subband for a second cooperative cell,
wherein the second CSI is generated to correspond to the secondary CSI-RS, and
wherein the second cooperative cell is configured to perform a transmission different than the joint transmission.

8. The UE according to claim 7, wherein the configuration information indicates CSI to which the configured common subband is applied.

9. The UE according to claim 7, wherein the configuration information is received using higher layer signaling.

10. The UE according to claim 7, wherein the CSI is determined based on a CSI index.

11. The UE according to claim 10, wherein the CSI index is determined based on a CSI-RS index.

12. The UE according to claim 10, wherein the CSI index is determined based on an interference measurement resource (IMR).

* * * * *